Aug. 14, 1928.  1,680,300
L. V. MALLORY
CYLINDER SADDLE MILLING MACHINE
Filed June 7, 1926 4 Sheets-Sheet 1
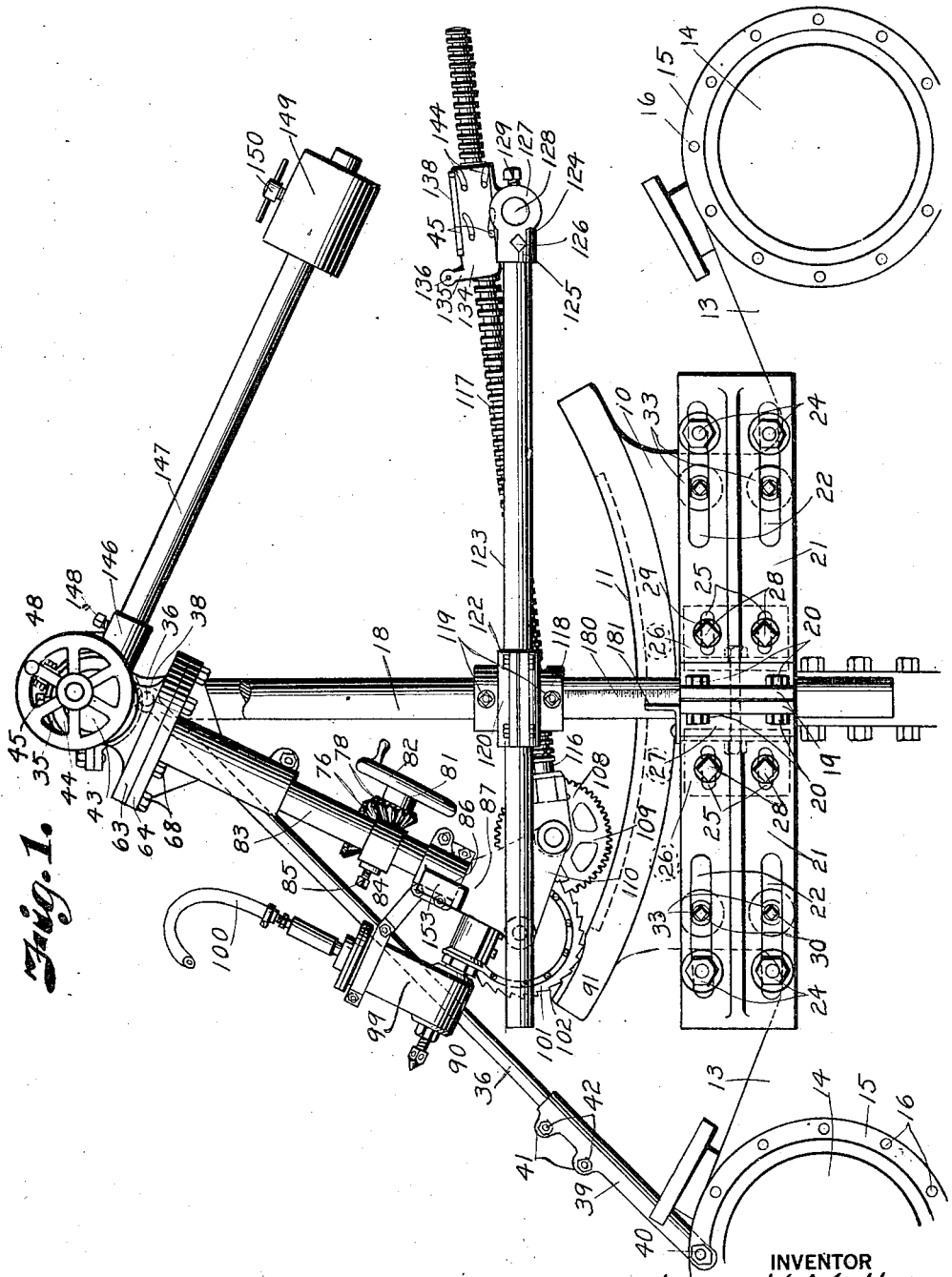
INVENTOR
Louis V. Mallory
BY
ATTORNEY Aug. 14, 1928.
L. V. MALLORY
1,680,300
CYLINDER SADDLE MILLING MACHINE
Filed June 7, 1926 4 Sheets-Sheet 2
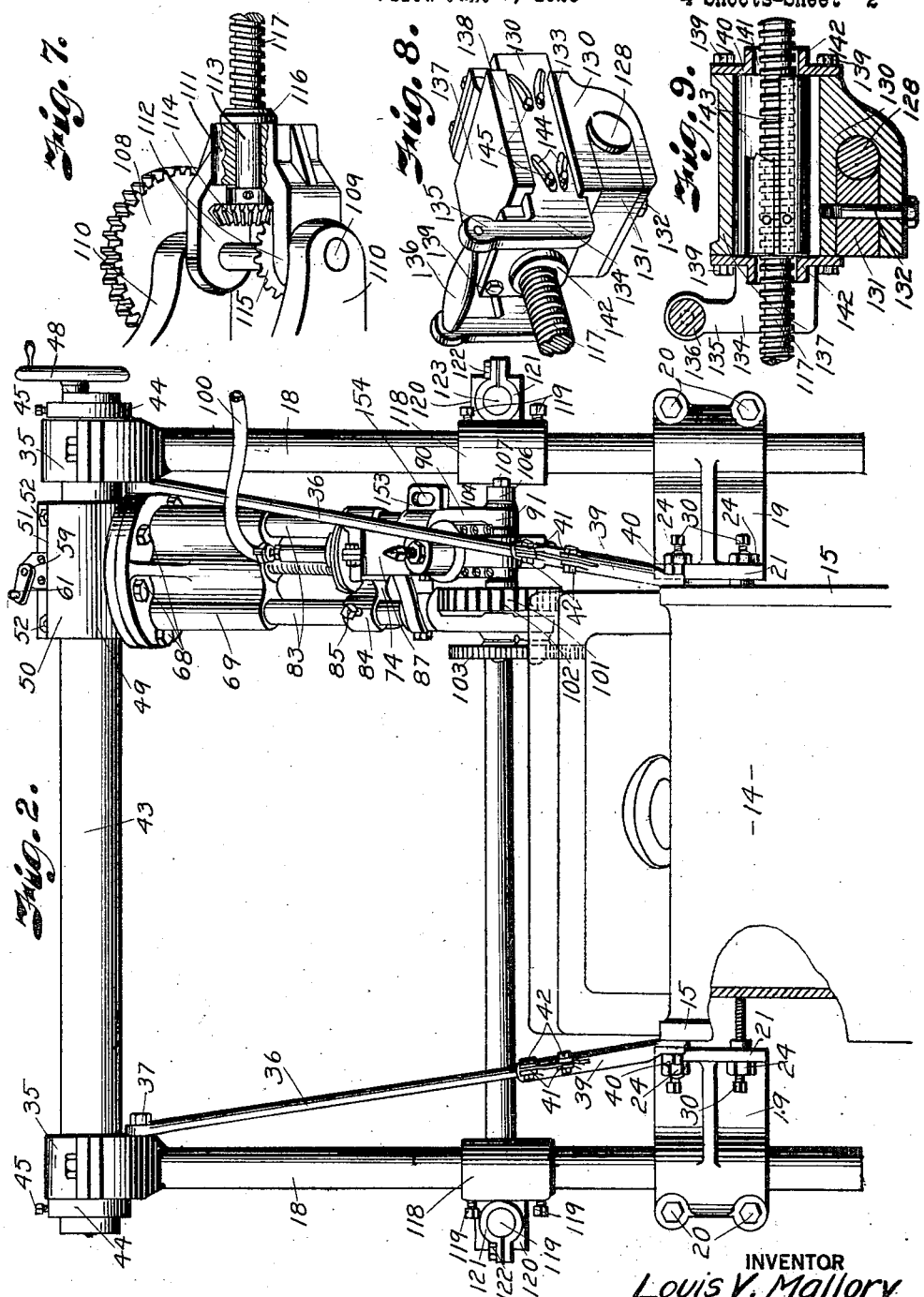
INVENTOR
Louis V. Mallory
BY
ATTORNEY

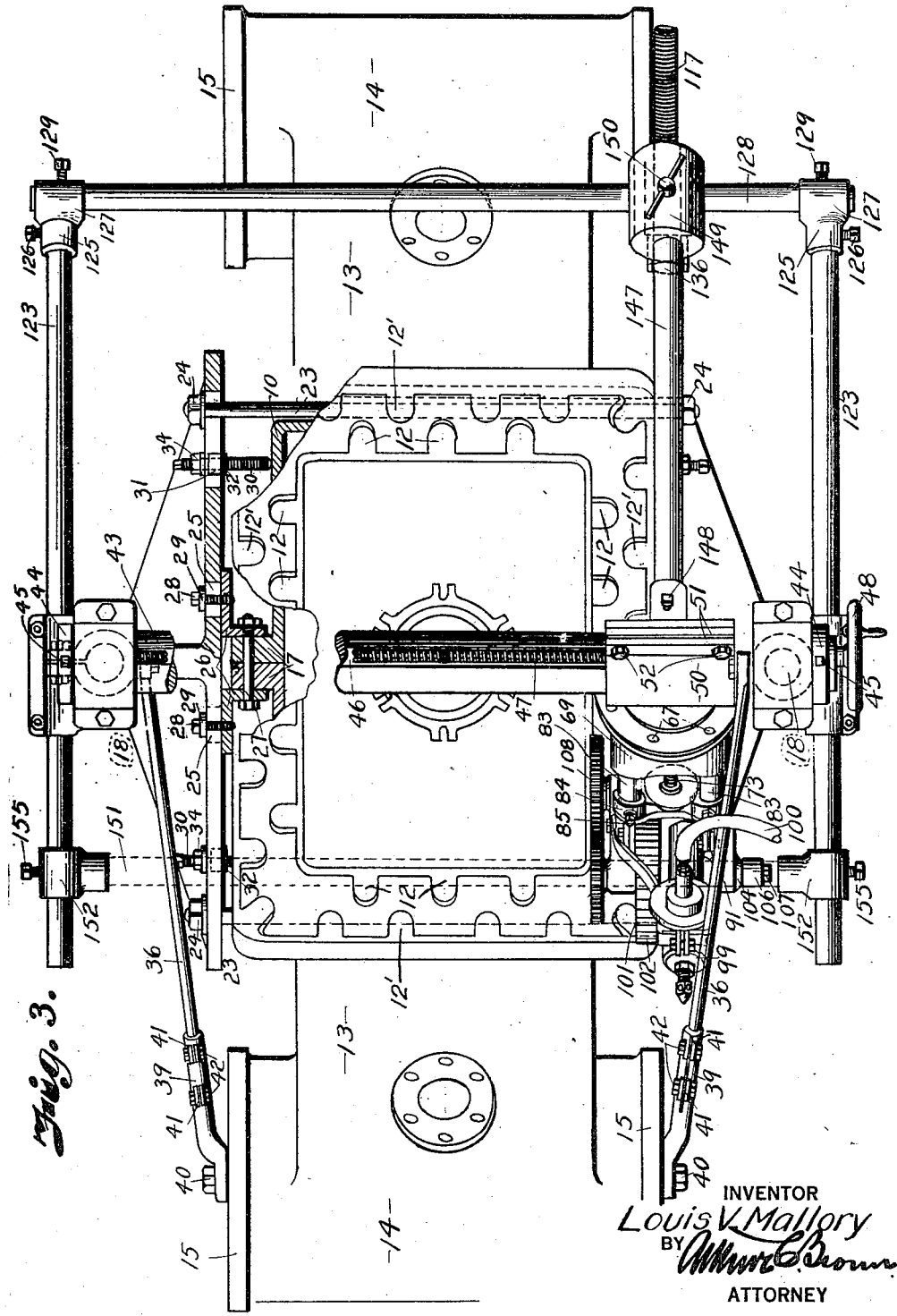

Aug. 14, 1928.
L. V. MALLORY
1,680,300
CYLINDER SADDLE MILLING MACHINE
Filed June 7, 1926    4 Sheets-Sheet 4
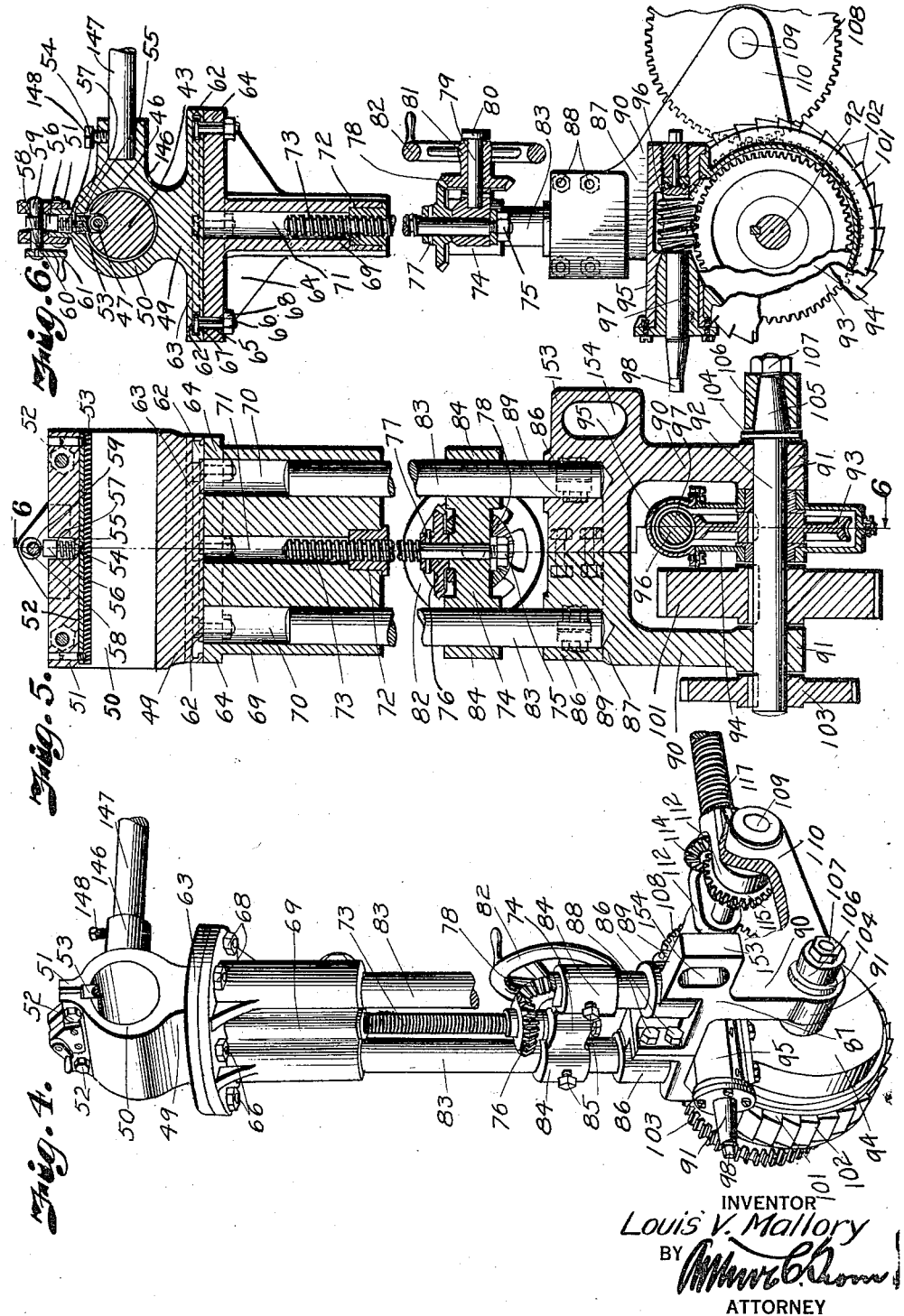
INVENTOR
Louis V. Mallory
BY
ATTORNEY Patented Aug. 14, 1928.

1,680,300

UNITED STATES PATENT OFFICE.

LOUIS V. MALLORY, OF KANSAS CITY, MISSOURI, ASSIGNOR OF ONE-HALF TO R. F. BEST, OF KANSAS CITY, MISSOURI.

CYLINDER-SADDLE MILLING MACHINE.

Application filed June 7, 1926. Serial No. 114,229.

My invention relates to cylinder saddle milling machines and more particularly to a machine for finishing the concave face of the cylinder saddle upon which the locomotive boiler is supported.

It is a purpose of my invention to provide a machine of the above mentioned character which is provided with a framework having means for securing the framework to the work to be operated on and which has a cutter carrying head mounted on the framework and means for supporting the cutter carrying head so as to swing about the axis of the supporting means and to be movable parallel to the axis of the supporting means so that the milling operation can be carried out both transversely and lengthwise of the boiler supporting portion of the saddle.

More particularly my improved milling machine comprises a supporting member mounted upon the framework that has the cutter member supported therefrom, said cutter member being rotatable about an axis substantially perpendicular to the axis of the support so that the cutter member can be turned to cut either transversely or lengthwise of the saddle. The cutter member is preferably driven by means of a suitable motor mounted upon the cutter head and means is preferably provided for feeding the cutter member in an arcuate path across the saddle so as to cut the same concavely.

A further purpose of the invention is to provide means for varying the radius of curvature of the cut and to provide means for feeding the cutter member that is driven by rotation of the cutter member but which is adapted to be thrown out of operation so that the cutter member can be fed substantially in a straight line when it is desired to cut lengthwise of the seat for the boiler in the saddle.

The means for supporting the milling machine relative to the work preferably comprises clamping members on the lower portion of the framework, carrying standards from which bracing members extend near the upper end thereof to the work in a diagonal direction. A suitable guiding member is also preferably mounted on the framework, whereby the cutter head is moved in a straight line path when cutting lengthwise of the work.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a side elevation, partly broken away, of my improved milling machine, showing the same in engagement with the saddle.

Fig. 2 is a side elevation thereof partly in section.

Fig. 3 is a plan view thereof, partly broken away and partly in section.

Fig. 4 is a perspective view of the cutter head and supporting arm therefor.

Fig. 5 is a vertical sectional view thereof.

Fig. 6 is a section taken on the line 6—6, Fig. 5.

Fig. 7 is a fragmentary perspective view of the feeding means for the cutter member at the end thereof mounted on the cutter head.

Fig. 8 is a similar view of the opposite end thereof, and

Fig. 9 is a longitudinal sectional view of the end of the feeding means shown in Fig. 8.

Referring in detail to the drawings,

My improved milling machine is shown as being used for milling a saddle member 10, the same being cast with projections 12 and 12' arranged in rows along the sides and ends of said saddle member 10 so as to support the locomotive boiler upon said projections, the projections being provided, as is well known, to reduce the amount of finishing necessary on the saddle member 10 for fitting the locomotive boiler in place thereon. The saddle member 10 is provided with laterally projecting portions 13 having cylinder members 14 thereon and being provided with flanges 15 that have a series of openings 16 around the same. The saddle member 10 is ordinarily made in two parts, being divided centrally lengthwise thereof and being provided with a pair of flanges 17 by means of which the two halves of the saddle are secured together.

My improved milling machine comprises a pair of standards 18 which are provided adjacent the lower ends thereof with the bracket members 19 which have suitable bores therein for receiving the standards 18 and which are split, as will be clear from Fig. 3, so that the same can be drawn tight on the standards 18 by means of the bolts 20. The bracket members 19 are provided with elongated flanges 21 having slots 22 therein through which the stay rods 23 extend, said rods being threaded on the opposite ends thereof and having the nuts 24 engaging therewith for drawing the bracket members 19 toward each other and holding the same from separation as the brackets are utilized for clamping the saddle member between the same. The flanges 21 are further provided with slots 25 and the flanges 17 have the angle members 26 secured thereto by means of the bolts 27, said angle members having screw threaded openings for receiving the headed screws 28 which have washers 29 mounted under the heads thereof and which clamp against the outer face of the flanges 21. Adjusting screws 30 are also mounted in the slots 22 and bear against the end faces of the saddle member 10. Screw threadedly engaging with the members 30 are the flanged collars 31, the flanges 32 thereon bearing against the inner sides of the flanges 21 and said members having flattened faces 33 engaging with the sides of the slots 22 to prevent turning thereof. It will be evident that by rotating the screws 30 the member 10 will be clamped between the flanges 21, thus clamping the framework to the work that is to be operated on by the machine. The parts are locked in adjusted position by means of the nuts 34 which clamp against the outer sides of the members 21.

The standards 18 are provided at the upper ends thereof with bearing members 35 and bracing rods 36 are secured to the bearing members 35 by means of bolts 37 passing through the eyes 38 in the ends thereof. The bracing rods 36 extend into the tubular members 39 which are secured to the flanges 15 by means of bolts 40 extending through one of the openings 16 and through an opening in the end of the sleeve 39. The sleeve 39 is split at the open end thereof and has the ears 41 thereon with which the bolts 42 engage to clamp the rod 36 in the member 39.

Journalled in the bearings 35 and rotatable therein is the transversely extending cutter head supporting shaft 43, said shaft being held in position against longitudinal movement by means of collars 44 provided with the set screws 45. The shaft 43 is provided with a groove 46 extending lengthwise thereof, in which is mounted a worm 47, the worm being held from endwise movement in said shaft 43 in any well known manner and being provided with a hand wheel 48 for rotating the same.

Mounted upon the shaft 43 is a swivel head 49 which is provided with a shaft embracing portion 50 which is split as at 51 and which is provided with bolts or other fastening members 52 for clamping the member 50 to the shaft 43 to hold the same from movement along the shaft. When the clamping means 52 are loosened the member 50 is free to slide along the shaft, and as said member 50 is provided with a screw threaded concave member 53 seating in a groove in the member 50 which may screw-threadedly engage with the worm 49, it will be obvious that when the threaded member 53 is in engagement with the worm 47, rotation of the hand wheel 48 will move the head 49 lengthwise on the shaft 43. The threaded member 53 is adapted to engage the shaft groove walls to rotate the shaft with the head 49 and is normally held out of engagement with the member 47 by means of the compression spring 54 which is seated in the socket 55 at one end thereof and which engages with a head 56 provided on the upwardly extending stem 57 provided on the member 53. In order to force the member 53 into engagement with the screw threaded member 47, a cam member 58 is provided which is mounted on a shaft 59 in the bearing 60 and which is rotatable by means of a handle 61.

The swivel head 49 is provided with a substantially T-shaped annular groove 62 therein around the flange portion 63 thereof, said flange portion being provided with a flat face against which the flat face on the head member 64 is adapted to engage, said head member being provided with an annular series of openings 65 in which the bolts 66 are mounted that have the flattened heads 67 seating in the groove 62. The head member 64 can accordingly be turned on the member 49 and can be clamped in position so that the same will not rotate on its own axis by tightening up the nuts 68 on the bolts 66. The head 64 is provided with a depending portion 69 which has a pair of side bores 70 therein and a substantially central bore 71 therein. Driven or otherwise fixed in the central bore 71 is a screw threaded flanged collar 72 with which the adjusting screw 73 screw threadedly engages. The adjusting screw 73 is mounted against endwise movement in a cross head 74, being provided with a nut 75 on the lower end thereof and having a bevelled gear 76 mounted on an unthreaded portion thereof projecting above the cross head 74, said bevelled gear being secured so as to rotate with the screw member 73 in any suitable manner, as by means of the pin 77. The gear 76 meshes with a bevelled gear 78 which is rotatably mounted upon a shaft 79 secured in and extending outwardly from the cross head 74, said shaft 79 having a head 80 on the end thereof and said bevelled gear 78 having a projecting hub portion 81 thereon which forms the hub of a hand wheel 82 by means of which the gears 78 and 76 are rotated. The rotation of the gear 76 will turn the screw 73 and move the cross head 74 relative to the member 69.

In order to properly guide the movements of the cross head and support the cutter head which will be described below, a pair of guide rods 83 are provided which are slidable in the bores 70 and which pass through the sleeve-like portion 84 on the cross head 74, said cross head being adapted to be clamped in position on the rods 83 by means of the screw threaded clamping members 85 which may be set screws or similar devices. The guide rods 83 also preferably extend into suitable sockets 86 in the cutter head 87. The cutter head 87 is preferably made in two parts which are secured together by any suitable fastening means such as the bolts 88. The socket members 86 are preferably split and are provided with the bolts 89 for drawing the same into clamping relation to the rods 83.

The cutter head 87 is preferably provided with a pair of depending bracket members 90 which are provided with bearing portions 91 for a shaft 92 upon which the worm wheel 93 is keyed, said worm wheel 93 operating in a housing 94 having a detachable cover member 95 within which is mounted a worm 96 which meshes with the worm wheel 93. The worm 96 is mounted on a shaft 97 and suitable bearings are provided in the housing 95 for said shaft and worm. To the squared end 98 of the shaft 97 any suitable driving means may be connected but preferably a compressed air motor 99 is connected therewith, the air being supplied thereto through a flexible member 100. Keyed to the shaft 92 is a cutter member 101 having the bevelled cutting teeth 102, said cutter member being mounted between the bracket members 90 and a gear 103 being keyed to the shaft 92 on the outer side of one of said bracket members 90. The shaft 92 is also provided with a washer 104 thereon that engages with the outer side of the opposite bracket 90 and with a tapered end portion 105 upon which the collar 106 is mounted which is also tapered, said shaft having a threaded end screw threadedly engaged by the nut 107 for holding the collar 106 in place.

Meshing with the gear 103 is a gear 108 which is mounted on a shaft 109 to rotate therewith, the shaft 109 being journalled in bearings in the forward extensions 110 on the brackets 90. A yoke-like member 111 having the arms 112 embracing the shaft 109 and adapted to turn thereon, is also provided, and a shaft 113 is journalled in said yoke 111. Said shaft has the bevelled gear 114 secured thereto so as to rotate therewith, which meshes with the bevelled gear 115 mounted on and rotating with the shaft 109. A suitable collar 116 is provided for holding the shaft 113 from endwise movement in the bearing 111 and the shaft 113 is provided with a screw threaded portion 117 which serves as a feed screw for the cutter head.

Slidably mounted on the standards 18 are the sleeves 118, said sleeves being adjustable up and down on the standards 18 and being provided with set screws 119 which are adapted for clamping the same in adjusted position. Each of the sleeves 18 is provided with an outward extension 120 which is provided with a split collar 121 provided with a bolt or other screw threaded clamping means 122 for clamping the rod 123 in position therein. Two rods 123 are provided, one for each of the members 118, and said members 123 have the T-shaped members 124 mounted on the ends thereof, said T-shaped members having a socket portion 125 embracing the members 123 and secured thereto by means of the set screws 126, and a cylindrical portion 127 through which the rod 128 extends, said rod being secured in position in the members 124 by the set screws 129.

A feed bracket 130 is mounted upon the rod-like member 128, said member 130 being provided with a removable portion 131 forming a portion of the socket through which the member 129 extends and a bolt 132 being provided for holding the member 131 in position. The member 130 is rotatable upon the rod-like member 128 and also slidable thereon. The upper portion of the feed bracket 130 is provided with a pair of flanges 133 between which are mounted the side plates 134 which are provided with upwardly extending ears 135 between which is mounted a handle 136. Mounted upon the side plates 134 is a cover plate 137 which has flanges 138 embracing the side plates 134, and secured to the cover plate 137 and to the bracket 130 by means of the bolts 139 are the end plates 140. The end plates are provided with openings 141 surrounded by the annular flanges 142 and the feed screw 117 extends through the housing formed by the plates 134, 137 and 140, and engages with a feed nut mounted within said housing which is made up of a pair of substantially semi-cylindrical members 143, each of which is threaded on the inner face thereof to engage with the threads on the feed screw. The side plates 134 are provided with oppositely inclined slots 144 through which the pins 145 on the members 143 extend, whereby said members 143 can be moved to a position into or out of engagement with the threads on the feed screw 117.

The head 49 is provided with a socket member 146 projecting from the side of the member 50 for receiving the rod-like member 147, the same being held in place by means of the set screw 148. Slidably mounted on the rod-like member 147 is a counter-weight 149 which is adapted to be clamped in any desired position on the rod 147 by means of the clamping member 150 which screw threadedly engages with the member 149.

In facing the concave portion 11 of the saddle 10 the projections 12' which lie along opposite ends of the saddle are first milled down to the required curvature, the parts being adjusted so that the cutter member is properly aligned first with one row of said projections 12' and is then successively moved over, after each row has been faced off, to the succeeding row by means of the worm 47, the cross head 74 being first adjusted to the proper position to get the proper radius of curvature for the cut by means of the hand wheel 82. In case the adjusting screw 73 does not move the cutter head to proper position for the desired radius of curvature of the cut, the cross head can be adjusted along the members 83 by loosening the set screws 85 and sliding the members 84 along on the members 83. The parts being properly adjusted, the cutter member is rotated by means of the compressed air motor 99 which is controlled in any desired manner, and as the cutter member 102 rotates, the same is moved across the member 10 in an arcuate path due to the fact that the feed screw 117 is driven through the gears 103, 108, 115 and 114. After the projections 12' have been faced in this manner the projections 12 which lie along the side edges of the saddle are faced. This is done by first removing the member 131 and 132 and then removing the bracket 130 from the feed screw 117. After this has been done the member 64 is rotated on the member 49, the nuts 68 being first loosened to permit such rotation, until the cutter head has been rotated through an angle of 90°, the cutter wheel then extending at substantially right angles to the direction in which it had previously extended. The nuts 68 are then tightened to hold the cutter head in proper position and a guide bar or rod 151 which is mounted on the T members 152 is extended through the ear 153 provided on the cutter head 87, said ear being provided with an elongated slot-like opening 154 which receives said guide member 151. The T-shaped members 152 are provided with socket portions for receiving the rod 151 and also with sleeve-like portions for slidably engaging with he rods 123, the same being adapted to be clamped in position on the rods 123 by means of the set screws 155. The guide rod 151 being adjusted to the proper position, the feed bracket 130 is placed in position on one of the rods 123, being first passed over the feed screw 117, and after the same is in position the member 131 is replaced thereon and secured in place by means of the bolt 132, the bracket 130 serving merely to support the feed screw when in this position and the members 143 being held out of engagement therewith. The cutter member 102 can then be moved in the direction of the length of the member 10 by means of the worm 47 by operation of the hand wheel 48, to face the projections 12.

A scale 180 may be provided on one of the standards 18 with which the pointer 181 mounted on one of the brackets 19 co-operates to aid in vertically adjusting the position of the member 50.

What I claim and desire to secure by Letters Patent is:

1. In a machine of the character described, a framework, means for securing the framework to the work to be operated on, a cutter carrying head, a rotatable arm carrying said head mounted on said framework, and means for supporting said arm, said arm being mounted to swing about the axis of said means and being rotatable about an axis transverse thereto and movable parallel to the axis of said means.

2. In a machine of the character described, a framework, work engaging means on said framework, a cutter head, a cutter head supporting member on said framework, a member connecting said cutter head with said supporting member, said connecting member being rotatable about the axis of and longitudinally movable on said supporting member, and means for moving said connecting member longitudinally on said supporting member, including an element on the connecting member movable into and out of operative position.

3. In a machine of the character described, a framework, work engaging means on said framework, a cutter head, a cutter head supporting member on said framework, a member connecting said cutter head with said supporting member, said member being swingable about the axis of said supporting member to move said cutter head in an arc about said axis, a rotatable cutter member on said cutter head, means for rotating said cutter member on said cutter head, and feeding means operable by said cutter member rotating means for moving said cutter head.

4. In a machine of the character described, a framework, work engaging means on said framework, a cutter head, a cutter head supporting member on said framework, a rotatable cutter member on said cutter head, a motor located at the head for rotating said cutter member on said cutter head, a member connecting said cutter head with said supporting member, said member being rotatable about the axis of and longitudinally movable on said supporting member, and feeding means operable by means provided in the head actuated upon rotation of said cutter for moving said cutter in an arcuate path.

5. In a machine of the character described, a framework, work engaging means on said framework, a cutter head, a cutter head supporting member on said framework, a rotatable cutter member on said cutter head, means for rotating said cutter member on said cutter head, a member connecting said cutter head with said supporting member, said member being rotatable about the axis of and longitudinally movable on said supporting member, feeding means connected for actuation at the head and actuated upon rotation of said cutter for moving said cutter in an arcuate path, and means for throwing said feeding means out of operation.

6. In a machine of the character described, a framework, work engaging means on said framework, a cutter head, a cutter head supporting member on said framework, a member connecting said cutter head with said supporting member, said member being swingable about the axis of said supporting member to move said cutter head in an arc about said axis, means for adjusting the radius of said arc, feeding means for moving said cutter head in an arcuate path, and means located at the head for actuating said last mentioned means.

7. In a machine of the character described, a framework, work engaging means on said framework, a cutter head, a cutter head supporting member on said framework, a member connecting said cutter head with said supporting member, said member being swingable about the axis of said supporting member to move said cutter head in an arc about said axis, means for adjusting the radius of said arc, a rotatable cutter member on said cutter head, means located at the head for rotating said cutter member on said cutter head, and feeding means connected with the means located on the head for moving said cutter head in an arcuate path.

8. In a machine of the character described, a framework, work engaging means on said framework, a cutter head, a cutter head supporting member on said framework, a member connecting said cutter head with said supporting member, said last mentioned member being rotatable relatively to the first mentioned member, said last mentioned member being rotatable about the axis of and longitudinally movable on said supporting member, and means on said framework engageable with means on said cutter head to retain said cutter head for cutting in a path substantially parallel to said axis.

9. In a machine of the character described, a framework, means for securing the framework to the work to be operated on, said framework comprising standards having work clamping means thereon at the lower ends thereof, a cutter carrying head mounted on said framework, and means for supporting said cutter carrying head, said head being mounted to swing about the axis of said means and being movable parallel to the axis of said means, and means associated with said head for driving the head longitudinally of said cutting head support and permitting the head to be freely moved longitudinally of said support.

In testimony whereof I affix my signature.

LOUIS V. MALLORY.